United States Patent

Settlemyer et al.

[11] Patent Number: 5,335,426
[45] Date of Patent: Aug. 9, 1994

[54] METHOD AND APPARATUS FOR THERMAL REGENERATION OF MOLECULAR SIEVE MATERIAL USED IN OXYGEN CONCENTRATORS

[75] Inventors: Bernard W. Settlemyer, Longmont; William A. Johnson, Littleton; Robert L. Johnson, Highlands Ranch, all of Colo.

[73] Assignee: Foothills Medical Equipment, Inc., Littleton, Colo.

[21] Appl. No.: 949,047

[22] Filed: Sep. 22, 1992

[51] Int. Cl.5 ............................................ F26B 21/06
[52] U.S. Cl. ........................................ 34/80; 34/82; 34/77; 96/143
[58] Field of Search ............... 34/80, 82, 72, 73, 77, 34/78, 79, 26, 27, 32, 22, 68, 69; 55/179, 180, 34; 96/143

[56] References Cited

U.S. PATENT DOCUMENTS

| | | | |
|---|---|---|---|
| 2,434,419 | 1/1948 | Laughlin et al. | 34/80 |
| 2,642,955 | 6/1953 | Huntington et al. | 34/80 |
| 3,621,585 | 11/1971 | Robertson | 34/80 |
| 3,756,961 | 9/1973 | Francis et al. | 252/419 |
| 4,251,923 | 2/1981 | Kuri | 34/80 |
| 4,570,360 | 2/1986 | Nakagomi | 34/80 |
| 4,601,114 | 7/1986 | Noguchi | 34/80 |
| 4,656,757 | 4/1987 | Oschmann | 34/80 |
| 4,784,672 | 11/1988 | Sircar | 55/26 |
| 4,858,335 | 8/1989 | Roth | 34/80 |
| 4,870,760 | 10/1989 | Gräff | 34/80 |
| 4,971,606 | 11/1990 | Sircar et al. | 55/25 |
| 4,974,337 | 12/1990 | Tavakoli et al. | 34/80 |
| 5,213,769 | 5/1993 | Whitlock | 34/80 |

Primary Examiner—Denise Gromada
Attorney, Agent, or Firm—Dorr, Carson, Sloan & Peterson

[57] ABSTRACT

Water contamination is purged from molecular sieve material used in oxygen concentrators by heating the molecular sieve material to a temperature in the range of approximately 450° to 950° F., and subjecting the molecular sieve material to a stream of dry sweep gas having a dew point in the range of approximately $-80°$ to $-100°$ F. In the preferred embodiment, the molecular sieve material is contained in a vessel and heated by means of a number of heating elements. In addition, a flow of dry sweep gas is produced by at least two drying chambers containing a desiccating material. A first valve assembly alternately cycles the sweep gas through the first drying chamber and then through said second drying chamber. A second valve assembly routes a portion of the sweep gas leaving the active drying chamber to the vessel, and routes the remainder of the sweep gas through the remaining drying chamber(s) to purge water from the desiccating material contained therein during the temporal portions of the cycle when each drying chamber is not supplying sweep gas to the vessel.

9 Claims, 2 Drawing Sheets

METHOD AND APPARATUS FOR THERMAL REGENERATION OF MOLECULAR SIEVE MATERIAL USED IN OXYGEN CONCENTRATORS

BACKGROUND OF THE INVENTION

1. Field of the Invention

The present invention relates generally to the field of thermal regeneration of water-contaminated molecular sieve material used in oxygen concentrators. More specifically, the present invention discloses a method and apparatus for regenerating molecular sieve material using a combination of heat and a dry sweep gas.

2. Statement of the Problem

Oxygen concentrators are widely used for medical purposes to produce concentrated oxygen by removing nitrogen from air. The pressure swing adsorption process used in virtually all present day oxygen concentrators is capable of producing up to 95.6% oxygen. There are currently estimated to be in excess of 500,000 of these systems in use.

A molecular sieve material, such as zeolite, is employed by the oxygen concentrator to capture the nitrogen molecules from the air. A typical oxygen concentrator contains up to ten pounds of molecular sieve material, at a cost of approximately $4.00 to $10.00 per pound. However, molecular sieves are also capable of preferentially adsorbing other constituents found in air, such as water vapor and carbon dioxide. In particular, they have an extremely high affinity for holding water molecules. When water vapor is allowed to accumulate in the molecular sieve material, the pores and capture surfaces are blocked for nitrogen removal. The concentrator thus fails to perform its intended purpose.

In commercial drying applications, the molecular sieve material must have a water content below 10% by weight to produce air with a $-40°$ F. dew point, and to below 3% by weight to produce air with a $-100°$ F. dew point. In contrast, in order for an oxygen concentrator to function efficiently, the molecular sieve material should have a water content below 1.5% by weight, and preferably below 1% by weight. A water content of 2% by weight will severely hamper concentrator performance. A 5% water content will render it useless. For example, a sieve exposed to 20% relative humidity at 80° F. will quickly accumulate a water content equal to 20% of its total weight and render it useless as an oxygen concentrator. Even commercially dry air having a dew point of $-40°$ F. is capable of contaminating molecular sieve material to 10% of its weight in water. Thus, water contamination is a major problem in molecular sieve materials used for concentrating oxygen to a much greater degree than in other commercial drying applications.

During normal operation of an oxygen concentrator, most atmospheric water vapor is ejected back into the atmosphere by the pressure swing operation of the concentrator. Water contamination of the molecular sieve material within the concentrator can result from valve failure, or other leakage, or if the molecular sieve material is accidentally exposed to atmospheric air for a period of time.

The prior art contains other examples of thermal regeneration of molecular sieve materials, including the following:

| Inventor | U.S. Pat. No. | Issue Date |
| --- | --- | --- |
| Sircar, et al. | 4,971,606 | Nov. 20, 1990 |
| Sircar | 4,784,672 | Nov. 15, 1988 |
| Francis, et al. | 3,756,961 | Sept. 4, 1973 |

Sircar, et al. U.S. Pat. No. 4,971,606, discloses a thermal regeneration system using a combination of high temperature and dry sweep gases (e.g. air or nitrogen) to remove water absorbed by zeolite adsorbents. A hot regeneration gas is passed through a bed of the adsorbent at a sufficiently high flow rate such that the residence time and reaction of the desorbed components in the adsorbent bed are minimized. Residence times of less than one second are discussed.

Sircar U.S. Pat. No. 4,784,672 discloses a process for regeneration of adsorbents used in pretreatment of landfill gas. One of the pretreatment sections is a layer of molecular sieve zeolite that is regenerated by a flow of hot regeneration gas.

Francis, et al., disclose a process for regenerating a bed of coke-containing zeolitic molecular sieves by continuously passing a closed-loop flow of hot, oxygen-containing inert gas through the molecular sieve bed. Water in the circulating gas stream is maintained below a predetermined concentration.

3. Solution to the Problem

None of the prior art references uncovered in the search show a method and apparatus for thermal regeneration of molecular sieve materials using a combination of heat and a dry sweep gas to achieve the extremely low water-content tolerances required by medical oxygen concentrators. In addition, the dual-chamber desiccant air dryer employed in the present invention is neither taught nor suggested by the prior art for this field of use.

SUMMARY OF THE INVENTION

This invention provides a method and apparatus for purging water contamination from molecular sieve material used in oxygen concentrators. The molecular sieve material is heated to a temperature in the range of approximately 450° to 950° F. and subjected to a stream of dry sweep gas having a dew point in the range of approximately $-80°$ to $-100°$ F. In the preferred embodiment, the molecular sieve material is contained in a vessel and heated by means of a number of heating elements. In addition, a flow of dry sweep gas is produced by at least two drying chambers containing a desiccating material. A first valve assembly alternately cycles the sweep gas through the first drying chamber and then through said second drying chamber. A second valve assembly routes a portion of the sweep gas leaving the active drying chamber to the vessel, and routes the remainder of the sweep gas through the remaining drying chamber(s) to purge water from the desiccating material contained therein during the temporal portions of the cycle when each drying chamber is not supplying sweep gas to the vessel.

A primary object of the present invention is to provide a method and apparatus for purging water contamination from molecular sieve materials to the tolerances required for effective operation of oxygen concentrators.

Another object of the present invention is to provide a method and apparatus for thermal regeneration of molecular sieve materials that is economical and reliable.

These and other advantages, features, and objects of the present invention will be more readily understood in view of the following detailed description and the drawings.

BRIEF DESCRIPTION OF THE DRAWINGS

The present invention can be more readily understood in conjunction with the accompanying drawings, in which.

DETAILED DESCRIPTION OF THE INVENTION

Figure 1:
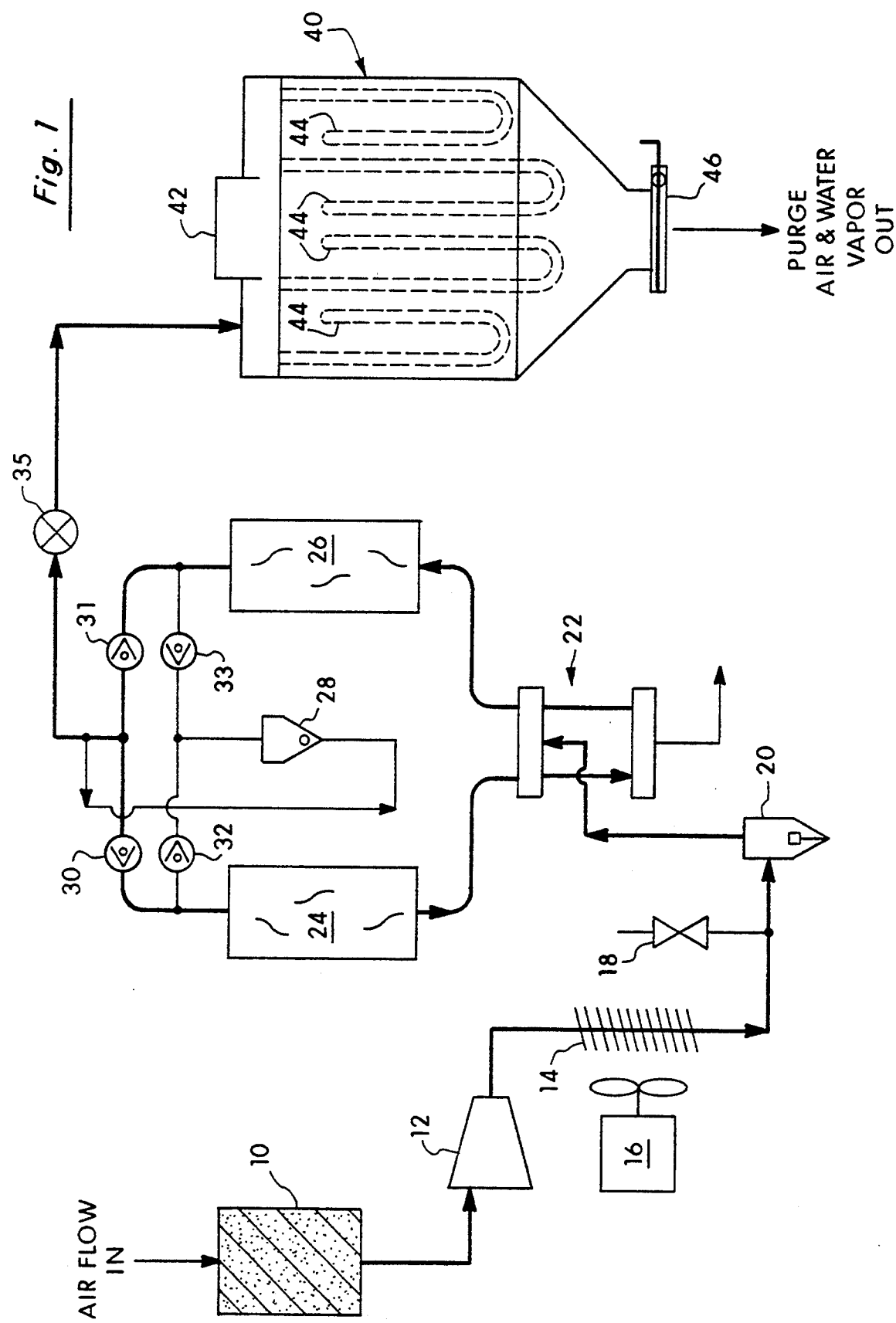
FIG. 1 is an overall schematic diagram of the thermal regeneration apparatus.

Turning to FIG. 1, a schematic diagram is provided of the entire thermal regeneration apparatus. The molecular sieve material to be treated is first placed in a vessel 40 through a fill door 42. In the preferred embodiment, the vessel 40 is made of stainless steel and is sized to hold approximately 43 pounds of molecular sieve material. The vessel 40 contains a number of heating elements 44 capable of heating the vessel and molecular sieve material to the desired operating temperature in the range of approximately 450° to 950° F. In the preferred embodiment, the operating temperature is maintained at approximately 550° F.

The remainder of the apparatus is used to produce a flow of dry sweep gas to purge moisture from the molecular sieve material within the vessel 40. For example, air can be used as the sweep gas, or alternatively nitrogen can be employed for this purpose. The sweep gas entering the vessel 40 must have an extremely low dew point in order to purge water contamination from the molecular sieve material to the tolerances required for use in an oxygen separator. For example, the dew point of the sweep gas should be on the order of approximately −80° to −100° F. In the preferred embodiment, the sweep gas is introduced at the top of the vessel 40, gradually flows downward through the molecular sieve material, and exits through small openings in the drain door 46 in the bottom of the vessel.

The sweep gas first passes through an air filter 10 (e.g. a HEPA filter) to remove particulates as shown at the left side of FIG. 1. The sweep gas is then compressed by a compressor 12 to produce adiabatic heating. In the preferred embodiment the compressor 12 produces an output flow of approximately 180 CFH at a pressure of approximately 50 psig. The compressed gas passes through a condenser 14 cooled by a fan 16 to cause some of the moisture in the gas to condense into liquid. This liquid-phase water is removed from the sweep gas by a water separator 20. An unloader valve 18 is included to allow manual release of pressure when the apparatus is being unloaded after use.

Next, the sweep gas is delivered to a switch valve assembly 22 shown in greater detail in FIGS. 2-5. The switch valve assembly 22 consists of two multi-port spindle valves, both of which can be electrically switched by solenoids between two positions. The switch valve assembly 22 alternately directs the flow of sweep gas to two drying chambers 24 and 26 containing a desiccating material. In the preferred embodiment, each drying chamber 24, 26 is a cylinder approximately 22 inches in length, with a radius of approximately 3.5 inches. These dimensions allow each drying chamber 24, 26 to contain approximately 5 pounds of zeolite as the desiccating material. Additional drying chambers could be added if desired.

Figure 2:
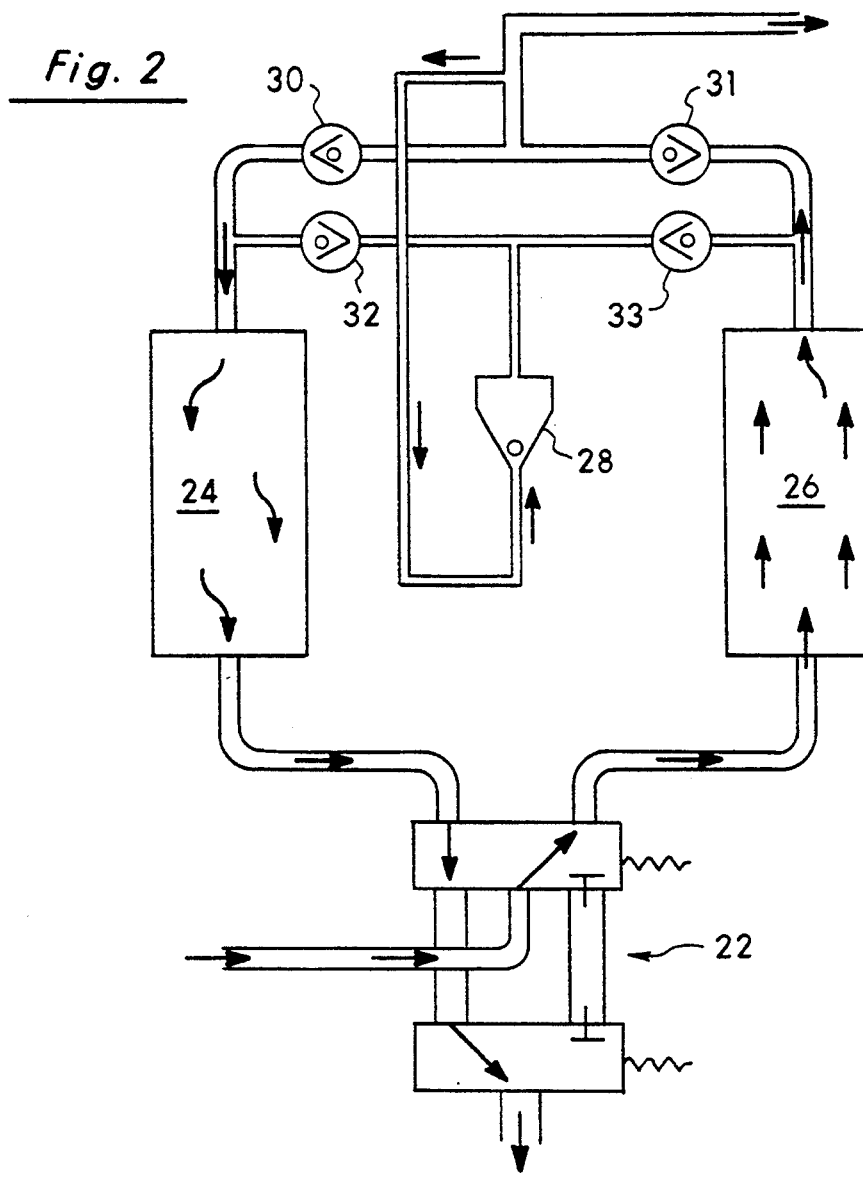
FIG. 2 is a simplified schematic diagram of the dual drying chambers configured to use the right drying chamber for drying, and to purge moisture from the left drying chamber.

As previously noted, the switch valve assembly 22 alternately routes the sweep gas through the left drying chamber 24 and then through the right drying chamber 26. (The drying chamber drying the sweep gas at any given moment is referred to as the "active" drying chamber. The other drying chamber is referred to as the "inactive" drying chamber.) In the preferred embodiment, each drying chamber dries the sweep gas for approximately 4 minutes per cycle. A series of check valves 30, 31, 32, and 33 direct the flow of sweep gas exiting the active drying chamber. These check valves 30-33 and the purge flowrator 28 direct a portion of the sweep gas leaving the active drying chamber to the vessel through a pressure reducing valve 35, and route the remainder of the sweep gas through the inactive drying chamber during the temporal portions of the cycle when each drying chamber is not supplying sweep gas to the vessel. The sweep gas purges water from the desiccating material contained in the inactive drying chamber and is vented to the atmosphere through the switch valve assembly 22 as depicted in FIG. 2. In the preferred embodiment, approximately 60 CFH of the sweep gas is delivered to the vessel 40 and approximately 120 CFH is used to purge the inactive drying chamber.

The cycle may be better understood by considering each of the steps in the cycle. For example, FIG. 2 shows the right drying chamber 26 being used to dry the sweep gas (i.e. active) and the left drying chamber 24 is being purged of moisture (i.e. inactive). At this step in the cycle, the sweep gas is supplied into the switch valve assembly from the left. The solenoid has positioned the upper spindle value to route the flow of sweep gas to the right drying chamber 26. The desiccating material in the right drying chamber 26 removes water vapor from the sweep gas, as previously described. The sweep gas exiting the right drying chamber 26 flows through the check valve 31, but does not pass the check valves 33 and 30. The flow splits downstream from the check valve 31, with a portion flowing through the pressure reducing valve 35 to the vessel 40, and the remainder flowing through the purge flowrator 28 and the check valve 32 to the left drying chamber 24. The respective flow rates through the left drying chamber and the vessel are determined by the relative flow resistances of these paths. These flow rates can be controlled to a degree by adjusting the purge flowrator 28.

Figure 3:
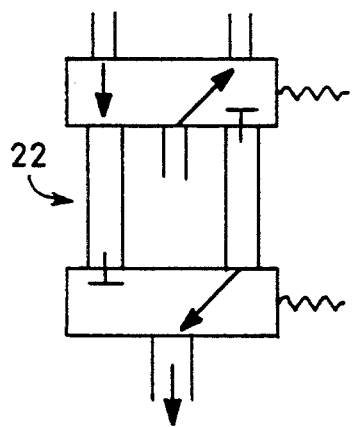
FIG. 3 is a simplified schematic diagram of the switch valve assembly for the drying chambers during changeover from the right drying chamber to the left drying chamber.

FIG. 3 shows the second step in the cycle. The solenoid of the lower spindle valve in the switch valve assembly 22 changes position to prevent sweep gas from venting from the left drying chamber to the atmosphere. This raises the pressure in the left drying chamber (i.e., to approximately 50 psig) to equalize the pressure in both drying chambers prior to the third step in the cycle.

Figure 4:
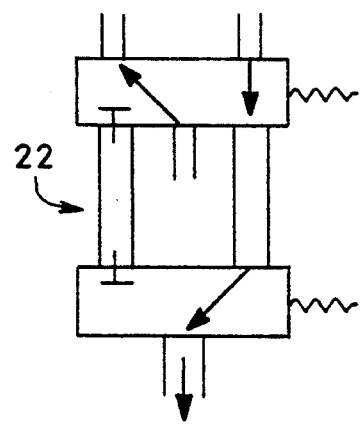
FIG. 4 is a simplified schematic diagram of the switch valve assembly for the drying chambers configured to use the left drying chamber for drying, and to purge moisture from the right drying chamber.

FIG. 4 shows the third step in the cycle. The solenoid of the upper spindle valve in the switch valve assembly 22 changes position to direct the flow of sweep gas from the condenser 14 to the left drying chamber 24. This step essentially reverses the order of the drying chambers. The left drying chamber 24 dries the sweep gas delivered to the vessel 40, and the right drying chamber 26 is purged of moisture. In particular, the desiccating material in the left drying chamber 24 removes water vapor from the sweep gas. The sweep gas exiting the left drying chamber 24 flows through the check valve 30, but does not pass the check valves 31 and 32. The flow splits downstream from the check valve 30. A portion flows through the pressure reducing valve 35 to the vessel 40. The remainder flows through the purge flowrator 28 and the check valve 33 to the right drying chamber 26. The sweep gas and moisture purged from the right drying chamber 26 is vented to the atmosphere through the switch valve assemble 22 as shown in FIG. 4.

Figure 5:
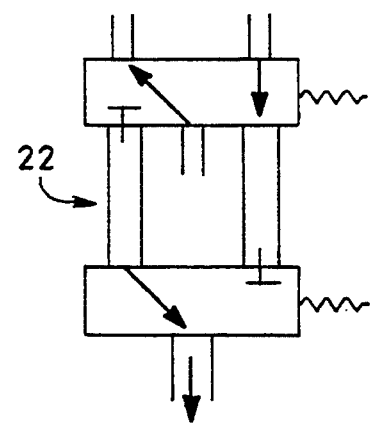
FIG. 5 is a simplified schematic diagram of the switch valve assembly for the drying chambers during changeover from the left drying chamber to the right drying chamber to complete the cycle.

FIG. 5 completes the cycle. The solenoid of the lower spindle valve in the switch valve assembly 22 changes position to prevent sweep gas from venting from the right drying chamber 26 to the atmosphere. This raises the pressure in the right drying chamber 26 to equalize the pressure in both drying chambers prior to repeating the cycle.

This cycle is repeated until water contamination of the molecular sieve material has been reduced to the desired level. In the preferred embodiment, this process can take two to three hours depending upon the quantity of molecular sieve material in the vessel and the initial degree of water contamination. At the end of the process, the molecular sieve material is emptied from the vessel 40 through a drain door 46.

In one alternative embodiment, a thermostat is included in the lower portion of the vessel 40 above the drain door 46. Since the dry sweep gas is introduced from the top of the vessel, the top layers of the molecular sieve material tend to be the first to be purged of moisture. The middle layers and then the bottom layers of the molecular sieve material are progressively purged as the regeneration process continues. A slight temperature rise occurs at each layer as it is purged, due to the fact that thermal energy is no longer being absorbed by vaporization of the water contamination at that layer. The thermostat detects when this temperature increase reaches to the bottom of the vessel 40 and then terminates the regeneration process.

The above disclosure sets forth a number of embodiments of the present invention. Other arrangements or embodiments, not precisely set forth, could be practiced under the teachings of the present invention and as set forth in the following claims.

We claim:

1. An apparatus for thermal regeneration of molecular sieve material contaminated with water comprising:
   a vessel for containing a quantity of said molecular sieve material;
   means for heating said molecular sieve material within said vessel to a temperature in the range of approximately 450° to 950° F.
   a first drying chamber containing a desiccating material;
   at least a second drying chamber containing a desiccating material;
   means for alternately cycling a flow of sweep gas through said first drying chamber to said vessel, and then through said second drying chamber to said vessel, said sweep gas entering said vessel having a dew point in the range of approximately −80° to −100° F.; and
   means for alternately purging water from said desiccating material in said drying chambers during that portion of said cycle when each drying chamber is not supplying sweep gas to said vessel.

2. The apparatus of claim 1, wherein said vessel is heated to a temperature of approximately 550° F.

3. The apparatus of claim 1, wherein said sweep gas comprises air.

4. The apparatus of claim 1, wherein said sweep gas comprises nitrogen.

5. The apparatus of claim 1, wherein said means for purging water from said desiccating material in said drying chambers comprises:
   means for routing a first portion of said sweep gas leaving the drying chamber to said vessel;
   means for routing a second portion of said sweep gas through the remaining drying chambers to purge water from said desiccating material contained therein; and
   means for alternately cycling the flow of said second portion of said sweep gas through said drying chambers so that water is purged from said desiccating material in said drying chambers during that portion of said cycle when each drying chamber is not supplying sweep gas to said vessel.

6. An apparatus for thermal regeneration of molecular sieve material contaminated with water comprising:
   a vessel for containing a quantity of said molecular sieve material;
   means for heating said molecular sieve material within said vessel to a temperature in the range of approximately 450° to 950° F.;
   a compressor for compressing a flow of sweep gas;
   a condenser for cooling said compressed sweep gas to cause condensation of water from said sweep gas;
   a water separator for separating said water from said sweep gas;
   a first drying chamber containing a desiccating material;
   at least a second drying chamber containing a desiccating material;
   a first valve for alternately cycling a flow of sweep gas from said water separator through said first drying chamber and then through said second drying chamber; and
   a second valve for routing a first portion of said sweep gas leaving the drying chamber to said vessel, and routing a second portion of said sweep gas through the remaining drying chambers to purge water from said desiccating material contained therein during that portion of said cycle when each drying chamber is not supplying sweep gas to said vessel, said sweep gas entering said vessel having a dew point in the range of approximately −80° to −100° F.

7. The apparatus of claim 6, wherein said sweep gas comprises air.

8. The apparatus of claim 6, wherein said sweep gas comprises nitrogen.

9. The apparatus of claim 6, wherein said vessel is heated to a temperature of approximately 550° F.

* * * * *